June 4, 1968  G. DRACH, JR  3,386,765
GLOVE BOX COMPARTMENT FOR A MOTOR VEHICLE
Filed Aug. 4, 1966  2 Sheets-Sheet 1

INVENTOR.
George Drach, Jr.
BY
Edward E. James
ATTORNEY

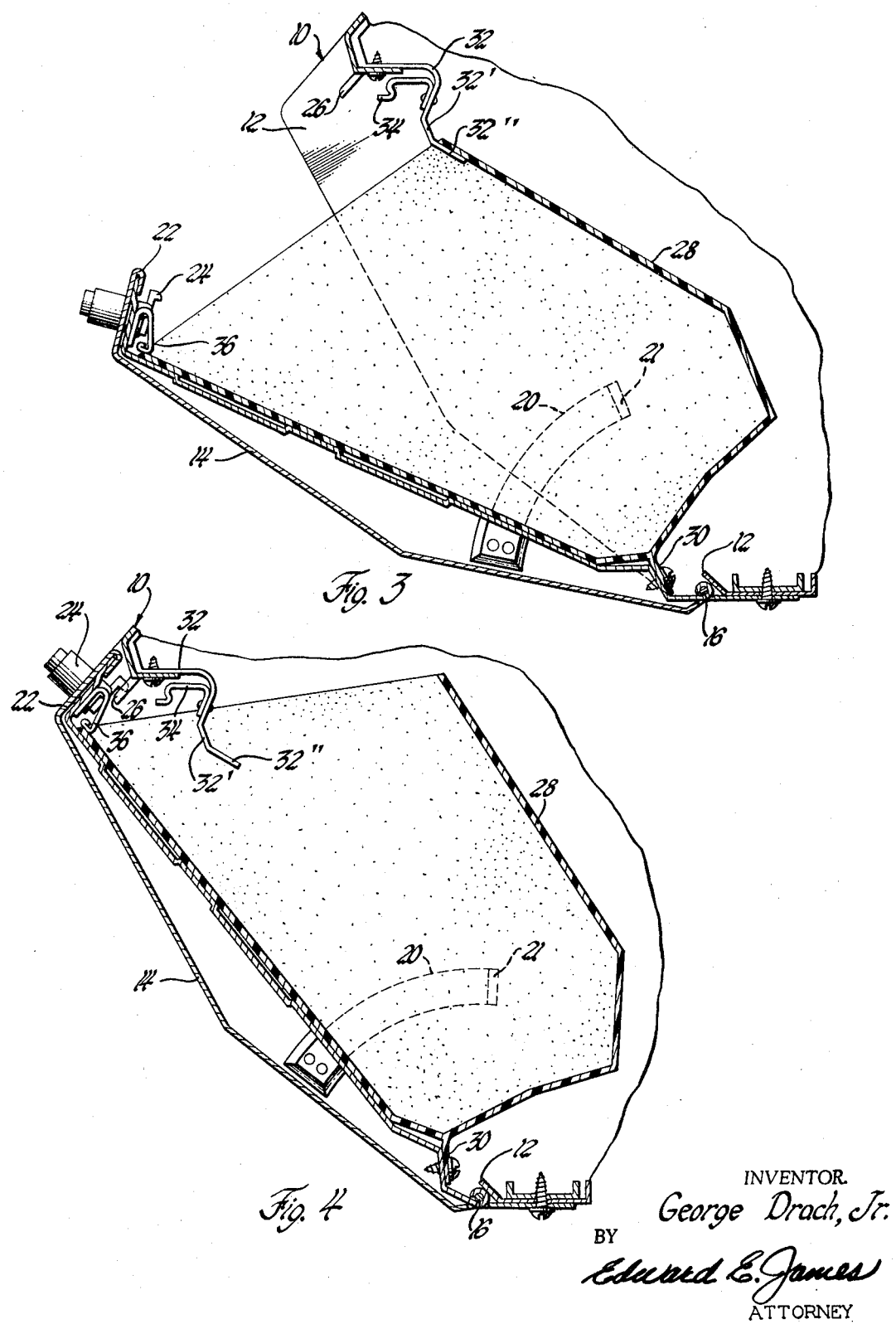

United States Patent Office 3,386,765
Patented June 4, 1968

3,386,765
GLOVE BOX COMPARTMENT FOR A MOTOR VEHICLE
George Drach, Jr., Warren, Mich., assignor to General Motors Corporation, Detroit, Mich., a corporation of Delaware
Filed Aug. 4, 1966, Ser. No. 570,287
8 Claims. (Cl. 296—37)

ABSTRACT OF THE DISCLOSURE

A glove compartment arrangement including an open-topped receptacle which is pivotally movable between a stored position in the compartment wherein said open top is inaccessible through said access opening, and an extended position wherein said open top is outside the access opening. A door is swingable between closed position in which it covers the access opening and open horizontal position in which it acts as a tray. The door and receptacle may be coupled to move together between the stored and extended positions of the receptacle, or may be uncoupled for independent movement.

---

This invention relates to a storage compartment for a vehicle body and more particularly to a glove box compartment or the like formed by a receptacle movable between a body stored closed position and an extended open position providing compartment access.

The dash or instrument panels of motor vehicles generally have an opening for access to a glove box compartment supported inwardly of the panel. The opening is normaly closed by a door mounted for desired movement relative to the panel. The size and location of the glove box and desired door movement are generally dictated by the contour and depth of the panel and by need to remove the glove box compartment for service access to various vehicle components located behind the panel.

For convenience, glove box doors are often hinged for swinging movement to a fully opened stop limited position wherein a horizontally disposed inner surface of the door may be used as a shelf or service tray to support refreshments, maps and other articles. When such a door is used as a service tray, articles stored in the glove box are exposed and often fall from the open compartment, particularly when the vehicle is in motion.

Bin-type receptacles often permit use of a somewhat larger glove box compartment with a particular instrument panel design, facilitate storage access, and prevent stored articles from falling when the box is opened. These bin-type receptacles generally include an attached door panel and are mounted for movement between a stored door-closed position and an inclined open position extending outwardly of the instrument panel. Such door attached compartments prevent use of the door as a service tray.

A primary object of the invention is to provide an improved glove box including a bin-type receptacle movable between opened and closed positions relative to the instrument panel opening and having a separate door movable between a closed position and a fully opened article supporting position independently of the receptacle and connectable for joint movement with the receptacle between its opened and closed positions.

In an illustrative glove box embodying the invention, a glove box door is hinged on the dash panel for swinging movement between its fully opened and closed positions. An open bin-type receptacle is separately hinged for independent swinging movement relative to the door and panel opening. The panel hinged door is selectively connectable to the receptacle and swingable therewith between a panel stored closed position and an extended open position of the receptacle. The separate hinge mounting of the door and receptacle further allows the door to be swung, independently of the stored receptacle, between its closed and fully opened article supporting positions relative to the panel opening. A panel mounted spring catch is operable to maintain the receptacle in a stop limited stored position when the door is swung to its fully open service tray position. A second door mounted spring catch normally secures the door for movement with the receptacle between its closed panel stored position and stop limited extended open position.

The foregoing and other objects, advantages and features of the invention will be apparent from the following description of the illustrative embodiment taken in conjunction with the accompanying drawings, in which:

FIGURES 3 and 4 are views similar to FIGURE 2 and show the door and receptacle in normal opened and closed positions of the receptacle relative to the instrument panel opening.

Figure 1:
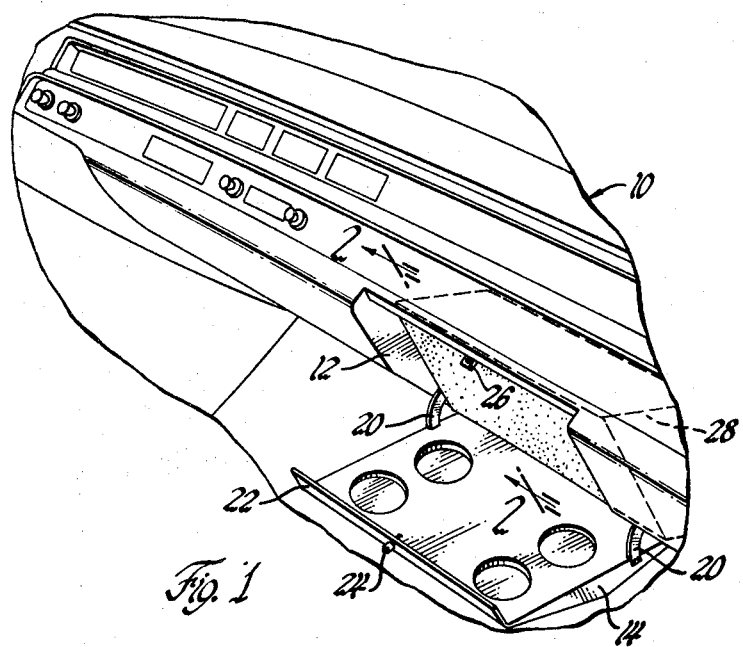
FIGURE 1 is a fragmentary perspective view of a vehicle instrument panel embodying the invention and shows a glove box door fully opened to an article supporting, service-tray position while a bin-type glove box receptacle remains latched in a stored panel closing position.

Referring more particularly to FIGURE 1, the illustrated vehicle dash or instrument panel 10 has a relatively large glove box opening 12. A door 14 is hinged at 16 for swinging movement between a fully opened position shown in FIGURES 1 and 2 and a panel engaging closed position shown in FIGURE 4. Arcuate straps 20 form angled stops 21 on opposite sides of the door. These stops are engageable with the side flanges of the panel opening and thus limit and support the door in its substantially horizontal, fully opened tray position.

The door 14 is fabricated as shown from complementary sheet metal stampings. The inner panel of the door forms a plurality of cup receiving recesses. The outer panel conforms with the instrument panel contour. An angled flange 22 formed by the door edge opposite the hinge 16 carries a push button latch 24. This latch is adapted to engage a cooperating striker 26 mounted by and projecting from the inturned upper flange of the instrument panel opening and thereby maintain the door in its closed position.

In accordance with certain aspects of the invention, a bin-type receptacle 28 molded of suitable plastic forms a glove box compartment having an obilque upper opening. An integral hinge flap 30 depends from the receptacle and is secured as shown to the inner door panel adjacent the door hinge 16. The hinge flap is flexible and thus permits independent swing movement between the receptacle and door.

Figure 2:
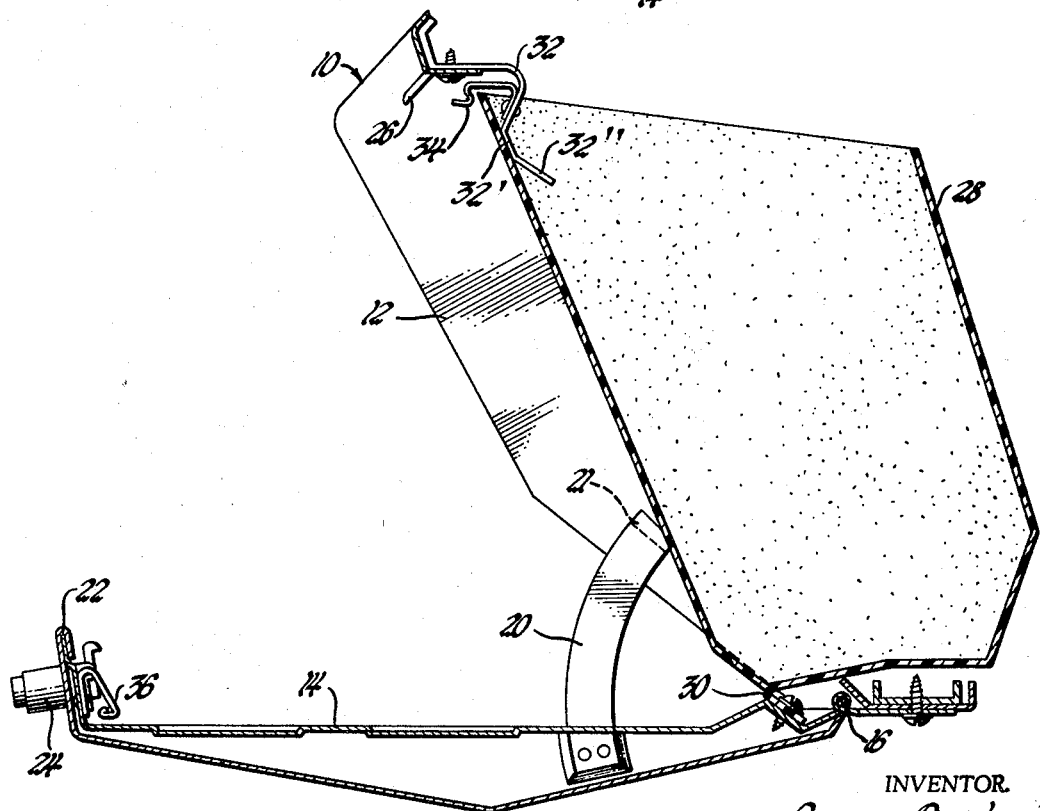
FIGURE 2 is a fragmentary sectional view taken substantially in the plane indicated at 2—2 in FIGURE 1.

A stop member 32 is secured to the upper inturned flange of the panel opening and is angled downwardly to engage the front and back walls of the receptacle as shown in FIGURES 2 and 3. A leaf spring catch or latch 34 is suitably mounted as shown on the stop member 32. This spring catch is deflectable to receive and retain the adjacent upper edge of the stored receptacle in abutment with a stop portion 32' as shown in FIGURE 2. The spring catch 34 thus cooperates with the stop portion 32' to establish a stored receptacle position wherein the latched receptacle substantially closes the panel opening independently of subsequent movement of the door 14 between its fully opened and closed positions.

When the door is fully or partially opened, upward deflection of the spring catch 34 releases and permits the stored receptacle to swing downwardly about the hinge flap 30 until the receptacle engages the partially opened door or until the opposite lower edge of the receptacle abuts the stop end portion 32" as shown in FIGURE 3. The stop end portion 32" thus establishes an extended position providing open access to the receptacle compartment.

After the stored receptacle has been released to its stop limited extended position, subsequent upward swinging movement of the door from its fully opened position causes a spring catch 36 mounted on the angled door flange 22 to latchably engage the adjacent upper edge of the extended receptacle. Such spring latching engagement also occurs when the stored receptacle is released and engages the partially opened door before reaching its extended position. Such engagement of the spring catch 36 provides for subsequent joint movement of the door and receptacle to and from the closed latch-engaged position of the door shown in FIGURE 4 and the extended receptacle and partial door opened position shown in FIGURE 3. Deflection of the spring catch 36 releases the door from the receptacle for independent movement of the door to its fully opened service tray position and independent movement of the receptacle to its catch maintained stored position closing the panel opening.

From the foregoing description it will be seen that the illustrative glove box construction accomplishes the previously stated objects, advantages and features of the invention. It will be further apparent that various changes and modifications might be made in the disclosed embodiment without departing from the spirit and scope of the invention as defined in the following claims.

I claim:

1. In combination with a vehicle body panel having a compartment access opening,
   a closure member movable between a closed position and a fully open article-supporting position relative to said opening,
   an open-topped receptacle movable between a stored position in said compartment wherein said open top is inaccessible through said access opening, and an extended position wherein said open top is outside said compartment access opening, said receptacle having front, back, and bottom walls which are fixed relative to each other, one of said walls closing said access opening when the receptacle is in stored position,
   means mounting and selectively connecting said closure member and said receptacle for joint movement between the extended and stored positions of the receptacle,
   said means being selectively operable to allow independent movement of the closure member between its closed and fully opened positions.

2. In the combination set forth in claim 1,
   said closure and receptacle mounting means being further operable to allow independent movement of the receptacle between its stored and extended positions when the closure member is in its fully open position.

3. The combination set forth in claim 1 further including
   a first stop means engageable selectively to establish stored and extended positions of the receptacle,
   and a second stop means engageable to support the fully opened closure member in its article supporting position.

4. The combination set forth in claim 1 further including
   a first latch means engageable to maintain the receptacle in stored position and releasable to permit movement of the receptacle toward its extended position, and
   a second latch means engageable to connect the closure and receptacle members for joint movement between their closed compartment stored positions and the extended position of the receptacle and releasable to permit independent movement between said members.

5. The combination set forth in claim 4 further including
   a first stop means engageable to establish the stored receptacle position maintainable by the first latch means,
   a second stop means engageable to establish the extended position of the receptacle, and
   a third stop means engageable to support the fully opened closure member in its article supporting position.

6. In the combination set forth in claim 1,
   said access opening lying in a vertically inclined plane,
   said closure member forming a combined article supporting tray and door adapted to close the access opening,
   the open top of the receptacle facing upwardly when the receptacle is stored and facing in a horizontally inclined plane providing access into the receptacle when the receptacle is extended,
   and said mounting means including a first hinge means mounting the closure member for swinging movement between a panel engaging closed position and its fully opened article supporting position independently of the stored receptacle, and
   a second hinge means mounting the receptacle for swinging movement between its stored and inclined extended positions independently of the previous position of the closure member relative to the receptacle and the panel opening.

7. The combination set forth in claim 6 further including
   stop means selectively engageable to establish the inclined extended and panel closing stored positions of the receptacle, and
   other stop means engageable to support the closure member in its fully opened article supporting position.

8. The combination set forth in claim 6 including
   a first latch engageable to maintain the receptacle in its stored position and releasable to permit swinging movement of the receptacle toward its inclined extended position,
   a second latch engageable to connect the closure and receptacle members for joint movement between their stored closed positions and the inclined extended position of the compartment member and releasable to permit independent movement between said members, and
   a third latch engageable to secure the closure member in its closed position relative to the panel opening.

References Cited
UNITED STATES PATENTS

| | | | |
|---|---|---|---|
| 1,146,759 | 7/1915 | Hawkins | 312—291 |
| 1,815,656 | 6/1931 | McMurray | 296—37 |
| 3,132,892 | 5/1964 | Stevens | 296—37 |

LEO FRIAGLIA, *Primary Examiner.*

BENJAMIN HERSH, *Examiner.*

J. A. PEKAR, *Assistant Examiner.*